United States Patent [19]

Pendergrast

[11] 3,860,023
[45] Jan. 14, 1975

[54] PROCESS FOR IMPROVING THE HANDLING CHARACTERISTICS AND TRANSPORT OF PHOSPHORIC ACID

[75] Inventor: Robert A. Pendergrast, Atlanta, Ga.

[73] Assignee: United States Steel Corporation, Pittsburgh, Pa.

[22] Filed: July 30, 1973

[21] Appl. No.: 383,842

[52] U.S. Cl. ................................. 137/13, 423/265
[51] Int. Cl. ............................................. F17d 1/16
[58] Field of Search ................... 137/1, 13; 423/265; 252/8.3; 208/370

[56] References Cited
UNITED STATES PATENTS
3,698,862   10/1972   Jolly................................... 137/13 X
3,753,749   8/1973   Nutt................................... 137/13 X

*Primary Examiner*—Alan Cohan
*Attorney, Agent, or Firm*—William L. Krayer

[57] ABSTRACT

Cellulosic materials preferably finely divided, are dispersed into wet-process phosphoric acid prior to loading into a rail car or truck. Solids formed before and after the addition are thereby inhibited from forming a packed coherent deposit not easily removed on unloading of the rail car or truck by draining or pumping.

7 Claims, No Drawings

PROCESS FOR IMPROVING THE HANDLING CHARACTERISTICS AND TRANSPORT OF PHOSPHORIC ACID

BACKGROUND OF THE INVENTION

The manufacture of phosphoric acid for use in fertilizer is for the most part by the wet-process, in which phosphatic ore is reacted with aqueous sulfuric acid to convert the initial mixture of phosphate rock and sulfuric acid to a final mixture of gypsum and phosphoric acid. Gypsum and other impurities not soluble in phosphoric acid are removed from the slurry by filtration. The amount of water used in the digestion process is ordinarily such that the resultant phosphoric acid liquor contains on a weight basis from 28 to 32% $P_2O_5$. Common terminology for this strength acid is filter acid. Since it is uneconomical to ship filter acid, it is usually concnetrated by evaporation of water. The concentration of shipping acid is somewhat variable, but is usually in the range of 48 to 60% $P_2O_5$. Impurities, largely compounds of iron and aluminum, which are soluble in filter acid are not necessarily soluble in the more concentrated acid. To the extent that these impurities precipitate during the evaporation it is common practice to remove them by centrifugation, the nature of the solids and the viscosity of the acid being such that filtration is usually impracticable.

The impurities are more soluble in hot than in cold phosphoric acid. Consequently, as the acid cools after concentration, additional solids are precipitated. However, the nature of phosphoric acid somewhat promotes a condition of supersaturation, which is discharged very slowly over a period of days or even weeks, during which time more and more solids appear in the product acid.

When the acid is loaded as by pumping into tank cars for shipment, solids initially present, and those formed during transit by discharge of supersaturation, tend to compact in the bottom of the rail car. The compacted solids are commonly termed "sludge." This sludge does not flow easily, with the net result that the customer is unable to unload the full amount for which he is billed, and a heel of sludge is returned to the shipper, requiring a tedious and costly solids removal and washing operation before the car is again placed in service. Also, if the acid is placed in the customer's storage tanks before supersaturation is completely discharged, there will be a progressive buildup of sludge at that point, necessitating a periodic cleanout and disposal operation.

An excellent discussion of the impurities and precipitates, or sludge, commonly found in wet-process phosphoric acid is presented by J. R. Lehr in Chapter 8, pp 637–650 of the book *Phosphoric Acid*, Vol. I, Part II, edited by A. V. Slack, Marcel Dekker, N.Y. (1968), and a description of the problems caused by sludge in shipping wet-process phosphoric acid is presented by A. W. Petersen at pages 1118-1120 of the same book. Both of these writings are expressly incorporated herein by reference as part of my specification. It should be noted particularly from the Lehr reference that the sludge formation is quite complex, involving at least 37 different listed compounds; as an example, one of the more important is $(Fe, Al)_3KH_{14}(PO_4)_8 \cdot 4H_2O$, which incidentally is a beneficial ingredient of fertilizers. My use of the term "sludge-forming components" herein is intended to include any of the preciptates and/or their precursers as described in the Lehr article.

The Petersen article recommends the use of rubber suits, lifelines, two or three men, etc. as safety precautions in the removal of sludge from tank cars, obviously an expensive and inconvenient process.

The impurities commonly observed in wet-process phosphoric acid, expressed as a percentage of the acid including $P_2O_5$, include generally about 0.5 to 5% gypsum, 0.5 to 2.5% $Al_2O_3$, and 0.5 to 2.5% $Fe_2O_3$. While gypsum is highly likely to be present, the figures just given are merely analytical expressions, i.e., the figure for gypsum may include some anhydrite, the aluminum may not actually precipitate as $Al_2O_3$, etc, as is known in the art. Frequently, rail cars will be returned with a large quantity of sludge to be removed. For example, a single shipment may result in a deposit of 10 tons of sludge in a 100 ton rail car. A return of 15 percent of the original contents of the car is not uncommon.

The sludge problem is common to all producers and users of wet-process phosphoric acid. Only those producers who consume their entire output in solid fertilizers at the acid production site are free of the burden imposed by delayed preciptation. The solids themselves are a valuable source of phosphate for fertilizer. It is only the handling, shipping, and storage problems which cause them to be an economic penalty.

Perhaps the most common treatment for wet-process acid in preparation for shipment is aging with gentle agitation to promote discharge of supersaturation, followed by centrifugation to yield as shipping acid a clarified fraction, and, for onsite consumption, a stream enriched in sludge. The limitations of this method are those associated with massive holding tanks for increased inventory, as well as the interrelationship of how much must be consumed on the site in proportion to the amount shipped. Much effort has been spent searching for ways to circumvent the problem. A concise description of the problem may be found in U. S. Pat. no. 3,481,700. The approach described in the patent is that of accelerating the postprecipitation so that the sludge may be removed from the acid before it is loaded for shipping. Other investigators have attempted to delay postprecipitation or alter the characteristics of the acid mixtures so that solids either do not form, or form in a state which is less likely to compact and be unpumpable. A modified sludge is described by Marion Sanders and Joseph Kealy in U. S. Pat. No. 3,457,061. Other methods of sludge modifications are described by A. V. Slack in "Phosphoric Acid" Vol. 1, Part 2, Marcel Dekker, Inc., New York, 1968, pp. 1,119–20, already referred to herein.

The reader may also be interested in U. S. Pat. Nos. 3,269,824 and 3,034,882 which show the treatment of cellulosic materials with phosphoric acid, and U. S. Pat. No. 3,408,162, disclosing the treatment of wet-process phosphoric acid with sodium lignosulfonate.

SUMMARY OF THE INVENTION

I have discovered that cellulosic matter, when dispersed in phosphoric acid of a concentration from about 48 to 60% $P_2O_5$, and containing solids of such nature that said solids tend to settle into a firm, cohesive layer, i.e., sludge-forming solids, is highly effective for the prevention of compaction of solids, thereby resulting in a soft sludge at least 50 percent of which may be easily pumped by conventional draining or pumping techniques used for the removal of the acid and removed from storage. The term cellulosic matter is intended to encompass not only refined cellulose, but to include as well any other materials of vegetable origin containing, as part of their structure and composition, cellulose, as typified by but not limited to waste paper, rice bran, nut shells, sawdust, bark, corn cobs, bagasse, cotton linters, etc.

My invention includes an improved method of loading rail cars with phosphoric acid and transporting it with a minimum accumulation of sludge. The methods of my invention include the dispersion of a cellulosic material, preferably newspaper or other wastepaper, into wet process phosphoric acid, concentrated up to about 60% $P_2O_5$ or in its original concentration of as little as 28% $P_2O_5$, prior to or during loading in a rail car such as a tank car or a truck, transporting it to a desired destination and removing the acid by conventional liquid flow means such as draining or pumping the car or truck whereby at least 50 percent of the sludge-forming components are removed with the acid. That is, the remaining sludge will be no greater in quantity than 50 percent of the sludge which would have remained after conventional liquid-flow removed without my treatment.

While not wishing to be bound by any particular theory as to the mode or circumstances leading to the described beneficial results, it is believed that there are three separate mechanisms working in harmony to produce said benefits. (1) Cellulose fibres, preferably dispersed in the liquid by a beating action increase the viscosity of the liquid medium and thereby retard settling of particulate matter. (2) Some portion of the cellulose reacts with phosphoric acid to yield phosphorylated cellulose, well known as an ion exchange medium, which may react with and bind metal cations present in the acid solution. (3) Other portions, notably the hemicelluloses, are probably hydrolysed to sugars and polysaccharides, which are known to have sequestering properties for metal cations. (4) Finally, any lignins and/or tannins present act as dispersants and cause the solids to form a loose rather than hard cake. The relative magnitude of the three complementary effects, i.e., thickening, sequestering and dispersing, will vary with the type of cellulosic matter employed. I may use from 3 to 40 pounds of cellulosic matter for each ton of acid material. The benefits of using less than 3 pounds are marginal, while the use of more than 40 pounds per ton of acid material is likely to yield a prohibitively high viscosity. 3 to 40 pounds per ton is equivalent to 0.15 to 2 percent by weight.

In the preferred practice of my invention it is necessary to reduce the cellulosic matter to a fine state of subdivision. Whether this is done before or after the addition to the acid depends on the type of cellulosic matter. In the case of wastepaper, I prefer to add sheets of paper to the acid and subject the mixture to a beating and shredding action. With a material such as pine bark, which may easily be comminuted, I prefer to grind the bark to a powder and then blend it with the acid by ordinary agitation. For best results, the bark or other relatively hard material should be ground to less than 200 mesh.

EXAMPLE I

A series of tests was conducted in which clarified acid was treated with selected additives to provide a pumpable underflow of post precipitated solids. The results are presented in Table I.

For these tests empty quart sample bottles were filled to an estimated 1,100–1,200 grams directly from the centrifuge discharge of a wet phosphoric acid process. Upon return to the laboratory weight adjustments were made to assure 1,000 gram sample weights. This procedure precluded variations in samples due to settling of solids in the 30–60 minutes between sampling and treating. Samples were then treated by mixing in a food blender at high speed for one minute, except the control and the Betz 1110 polyfloc.

All samples were stored statically overnight and then vibrated for three hours, and returned to shelf storage.

The evaluation, percent flowability, was measured 1 week after initial treatment. The sample container was tilted 45° and the liquid allowed to drain for 1 minute and full, empty, and clean container weights recorded. Where $X$ = gross weight of container plus sample
$Y$ = container weight plus residual, unflowable, solids
$Z$ = clean, dry, empty container weight Then $(x - y/x - y) \times 100$ = percent Flowability Table I

| Additive | Quantity Added | Solids Suspension 54% $P_2O_5$ Acid Flowability, % | | | |
|---|---|---|---|---|---|
| | | April 19 | April 20 | April 26 | April 28 |
| Control | None | 96.3 | 88 | 91.5 | 87.5 |
| Betz 1110 Polyfloc | 10 ppm | 94.5 | 90 | 92.5 | 87.5 |
| Newspaper | 0.25% | 95.1 | 95 | 92.5 | 92.5 |
| Lignosite | 0.5% | 96.5 | 90 | 92.5 | 87.3 |
| Attapulgite Clay | 0.5% | 96.3 | 90.5 | 91.5 | 88.3 |
| Dequest 2000 | 0.1% | 96.7 | 86 | 91.5 | 89.3 |

EXAMPLE II

An aged wet-process phosphoric acid derived from Florida phosphate rock, showing a very high impurity level, had the following analysis:

| | % |
|---|---|
| $P_2O_5$ (Total) | 48.28 |
| $P_2O_5$ (Water Soluble) | 45.92 |
| $P_2O_5$ (Citrate Insoluble) | 0.06 |
| $Fe_2O_3$ | 1.90 |
| $Al_2O_3$ | 2.56 |
| MgO | 1.11 |
| CaO | 1.72 |
| $SO_4$ | 6.06 |
| F | 2.88 |
| Suspended Solids | 15.1 |
| Water | 17.7 |
| Specific Gravity | 1.753 |

A homogenous portion of this acid, 200 g., was placed in a Waring Blender along with a 2.0-g. portion of a Scott Utility-Wipe paper towel. The paper was shredded into the liquid by operating the blender at the "high" setting for 5 min. 100 ml. of the preparation was poured into a 100-ml. graduated cylinder. After 24 hr., the cylinder was inclined at 45° below horizontal for 60 sec. to test the pourability of the dispersion. There was no sludge layer adhering to the bottom, and pourability was rated 100 percent. The material was returned to the cylinder and allowed to stand for an additional 7 days, after which time it still showed 100 percent pourability, with no evidence of sedimentation.

EXAMPLE III

The acid of Example II was used in this test. In a Waring Blender, 200 g. of acid was mixed with 1.0 g. of Excelsior to test the effect of raw wood. After 5 min. at the "high" setting, dispersion of the wood was incomplete, with some visible segments persisting. The mixture was poured into a 100-ml. graduated cylinder, and, for comparison, a second 100-ml. cylinder was filled with dispersed but untreated acid.

After 24 hr., each cylinder was inverted at 45° from horizontal for 60 sec., then replacedd in an upright position for 20 min. to allow wall drainage. The untreated cylinder contained 12 ml. of residue, while the one treated with Excelsior contained only 7 ml. of residue. This was rated as a 41 percent reduction in sludge.

EXAMPLE IV

A quantity of outer bark from Loblolly pine was collected and ground to pass a 12-mesh screen. Its effect on dispersion of sludge was investigated by taking 200-g. replicate portions of the acid of Example II and mixing therewith in a Waring Blender 0.0, 0.5, 1.0, and 2.0 g. of bark. The specimens were poured into graduated cylinders as before and tested after 48 hr. The specimen without pine bark had a cohesive layer of sludge which would not drain from the cylinder bottom. All three treated specimens drained to reveal the clear glass cylinder bottoms.

EXAMPLE V

Four 200-g. portions of the previously described acid (Example II) were mixed in a Waring Blender with waste newsprint, 0.5, 1.0, 2.0 and 4.0 g., respectively. Each was poured into a 100- ml. graduated cylinder and allowed to stand for 48 hr., after which the following observations were made:

| Paper, g. | Solids | ml. Turbid | Clear | Residue after pouring, (ml. after 20 min. upright) |
| --- | --- | --- | --- | --- |
| 0.5 | 42 | 43 | 15 | 7 |
| 1.0 | 0 | 61 | 39 | 4 |
| 2.0 | 0 | 86 | 14 | 5 |
| 4.0 | 0 | 100 | 0 | 12 |

In explanation of the above table, the first cylinder, by visual observation, contained a distinct lower layer of settled solids which terminated at a sharp interface at 42 ml., and had superimposed thereon a 43 ml. stratum of dispersed solids, above which the supernatent liquor was brown, but translucent. The remaining cylinders showed no stratification of solids, but the dispersed band became progressively larger. After the pour test, re-righting of the cylinders allowed wall-adhering matter to drain into the bottom for a volume reading. The dispersion in cylinder No. 4 was so viscous that it might not be moved by a centrifugal pump. Cylinders 2 and 3 drained initially to the point where clear glass was visible at the bottom, but due to the wall effect and viscosity, an appreciable quantity returned after re-righting. Either was judged to be totally pumpable.

EXAMPLE VI

A quantity of the acid of Example II was heated to 185° F. with agitation for 16 hr. in order to return to solution whatever solids would dissolve at the higher temperature. Agitation was then ceased for 30 min. to allow the heavier solids to settle, after which the major portion of the acid was decanted. The decanted material was heated again to 185° F. with agitation, and four 500-g. portions poured into tared wide-mouth screw-cap jars. One was retained as a control blank, while to the other three were added 2.5 g. of chopped newspaper (1/2 in. × 1/4 in. flakes), pulverized pine bark, and pulverized pecan shells, respectively. The additives were dispersed into the acid by vigorous shaking for 5 min. It was noted that the newsprint flakes rapidly dispersed to a pulp. The four bottles were left in quiet storage for 7 days to cool and settle, after which each was inclined at 45° below horizontal for 2 min., and the percent pourable calculated from the weight of the residue. After the pouring test, the material was returned to the respective bottles, shaken to assure homogeneity, and tested for viscosity with a Brookfield viscometer. Results are shown in the following table.

| | To 500 g. hot, saturated acid | |
| --- | --- | --- |
| Additive | % Pourable, 7 Days | Viscosity, Centipoise |
| Newsprint, 2.5 g. | 95.44 | 450 |
| Pulverized pine bark, 2.5 g. | 95.38 | 192 |
| Pulverized pecan shells, 2.5 g. | 96.24 | 182 |
| None | 88.04 | 160 |

My invention results in greatly improved fluid handling properties in wet-process phosphoric acid, thereby permitting a manufacturer of wet-process acid to ship incompletely clarified acid without as large a freight penalty due to returned sludge. By having the ability to maintain acid solids, i.e., sludge-forming components, in a pumpable and therefore transportable form, the manufacturer is freed to a large degree from the constraints as to how much of his product must be consumed at the production site and how much may be shipped in commerce.

Whereas prior art has taught in some cases the use of very large quantities of sludge modifiers (U.S. Pat. No. 3,457,061), or in other cases the use of small quantities of specialty chemicals such as dispersants or flocculants, my invention makes use of inexpensive naturally occurring compounds or materials frequently classified as waste, and in amounts ranging from 3 to 40 pounds per ton of acid material (0.15% to 2%).

Although the examples cited do not illustrate any combinations of the waste materials, a combination of two or more waste materials might be more effective on a pound for pound basis than either material alone.

I do not intend to be bound by the above specific illustrations and examples. My invention may be otherwise variously practiced within the scope of the following claims.

I claim:

1. Method of improving the handling and pumping characteristics of wet-process phosphoric acid and inhibiting the formation of coherent masses of sludge therein during storage and transport comprising adding to said wet process phosphoric acid an effective amount of a cellulosic material.

2. Method of claim 1 in which the cellulosic material is finely divided.

3. Method of claim 1 in which the cellulosic material is newspaper.

4. Method of transporting wet-process phosphoric acid comprising adding thereto from about 0.15 percent to about 2 percent of a cellulosic material, placing it in a vehicle, transporting the vehicle, and removing the phosphoric acid therefrom including at least 50 percent of the sludge-forming components therein.

5. Method of claim 4 in which the acid is removed from the vehicle by conventional liquid flow means.

6. Method of claim 4 in which the cellulosic material is shredded newspaper.

7. Method of claim 4 in which the vehicle is a tank car.

* * * * *